Inventor:
Alfred Gruenhut
By: [signature]
Attorney

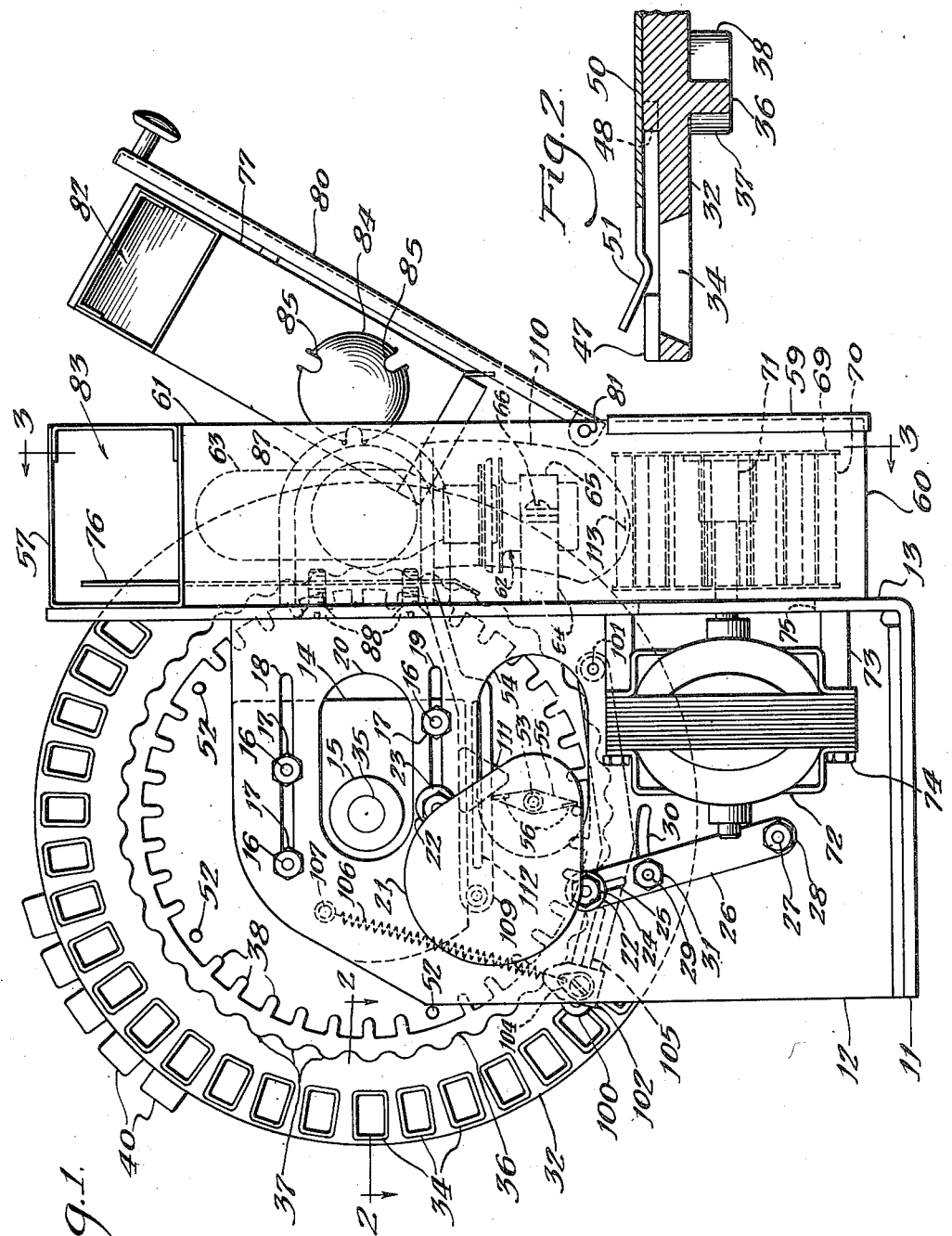

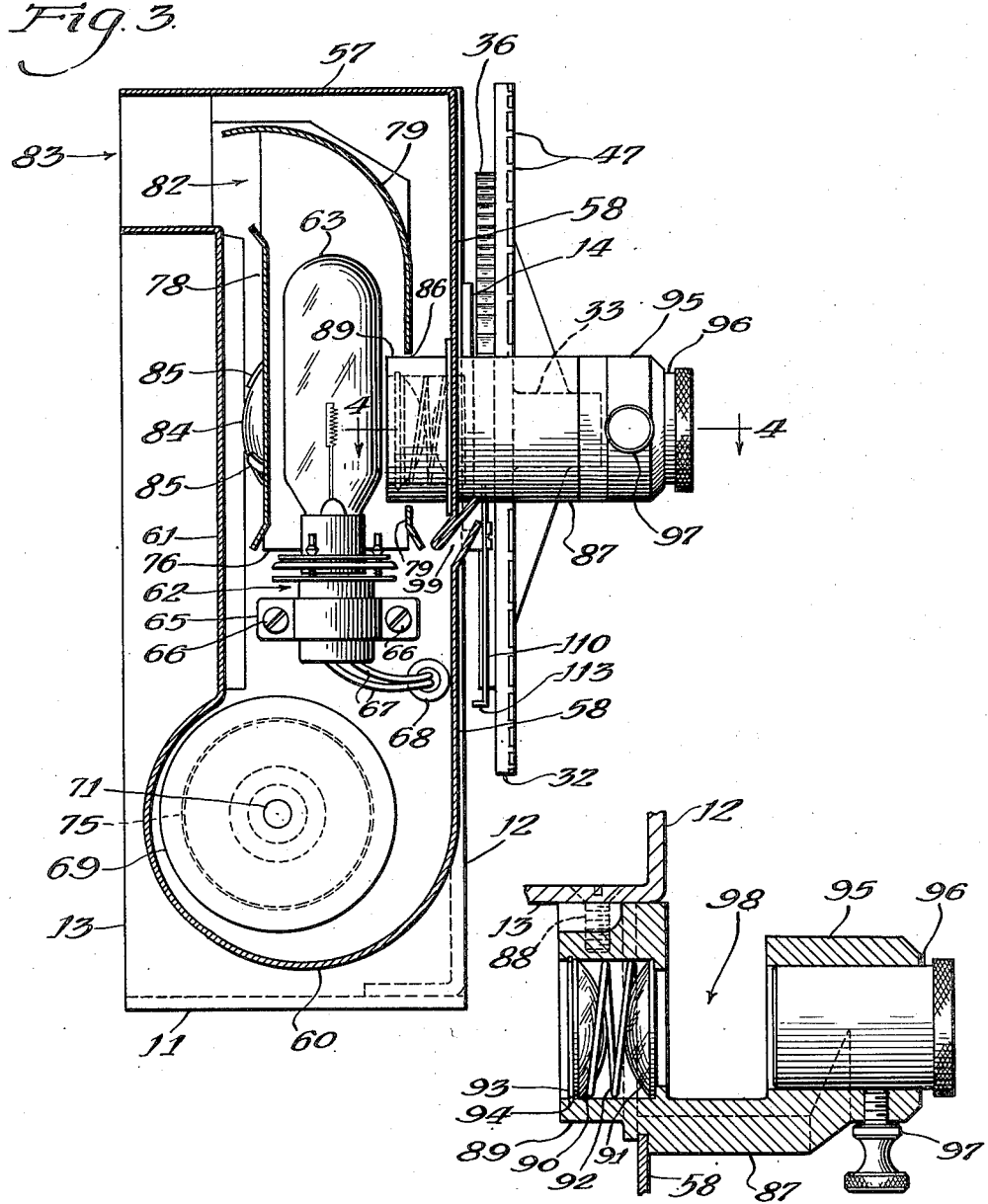

Patented July 10, 1951

2,560,390

UNITED STATES PATENT OFFICE 2,560,390

LIGHT PROJECTOR FOR DISPLAYING IMAGES CARRIED BY AN INTERMITTENTLY ROTATABLE WHEEL

Alfred Gruenhut, Chicago, Ill., assignor to Mills Industries, Incorporated, Chicago, Ill., a corporation of Illinois Application April 4, 1947, Serial No. 739,435

8 Claims. (Cl. 88—27)

This invention relates to improvements in light projectors and more particularly to apparatus for sequentially projecting a plurality of images for display purposes.

The apparatus of my invention provides a means for mounting a predetermined number of negatives of "still" pictures and for sequentially and automatically moving said negatives into a beam of light whereby said pictures may be projected upon a screen for purposes of advertising or the like. The changing display thus afforded may be attractively projected upon a screen of any size and, if desired, the entire apparatus may be mounted within a coin vending machine cabinet having a translucent screen in the front thereof upon which said display may be shown to attract customers and to illustrate the various products available in the vending machine.

An object of my invention is to provide in such an apparatus means by which various sizes of wheels for holding said negatives may be employed, whereby a greater or lesser number of pictures may be projected, as desired, during one complete projection cycle.

Another object of my invention is to provide in said apparatus a simple selective means whereby every second one of said negatives may be projected to thus reduce by half the number of pictures displayed during said cycle regardless of the size of the wheel employed.

Other objects and advantages of the invention, such as the simplicity of all of the parts, will be apparent from the following description of a preferred embodiment thereof, taken in conjunction with the accompanying drawings, in which:

Fig. 1 is a rear elevational view of a machine incorporating my invention;

Fig. 2 is an enlarged fragmentary cross-sectional view of the peripheral portion of the negative-holding wheel, taken on a line 2—2 in Fig. 1, showing the means for mounting the negatives thereon;

Fig. 3 is a cross-sectional view of the machine taken on a line 3—3 in Fig. 1;

Fig. 4 is an enlarged cross-sectional view of the lens holding member taken on a line 4—4 in Fig. 3;

Figure 5:
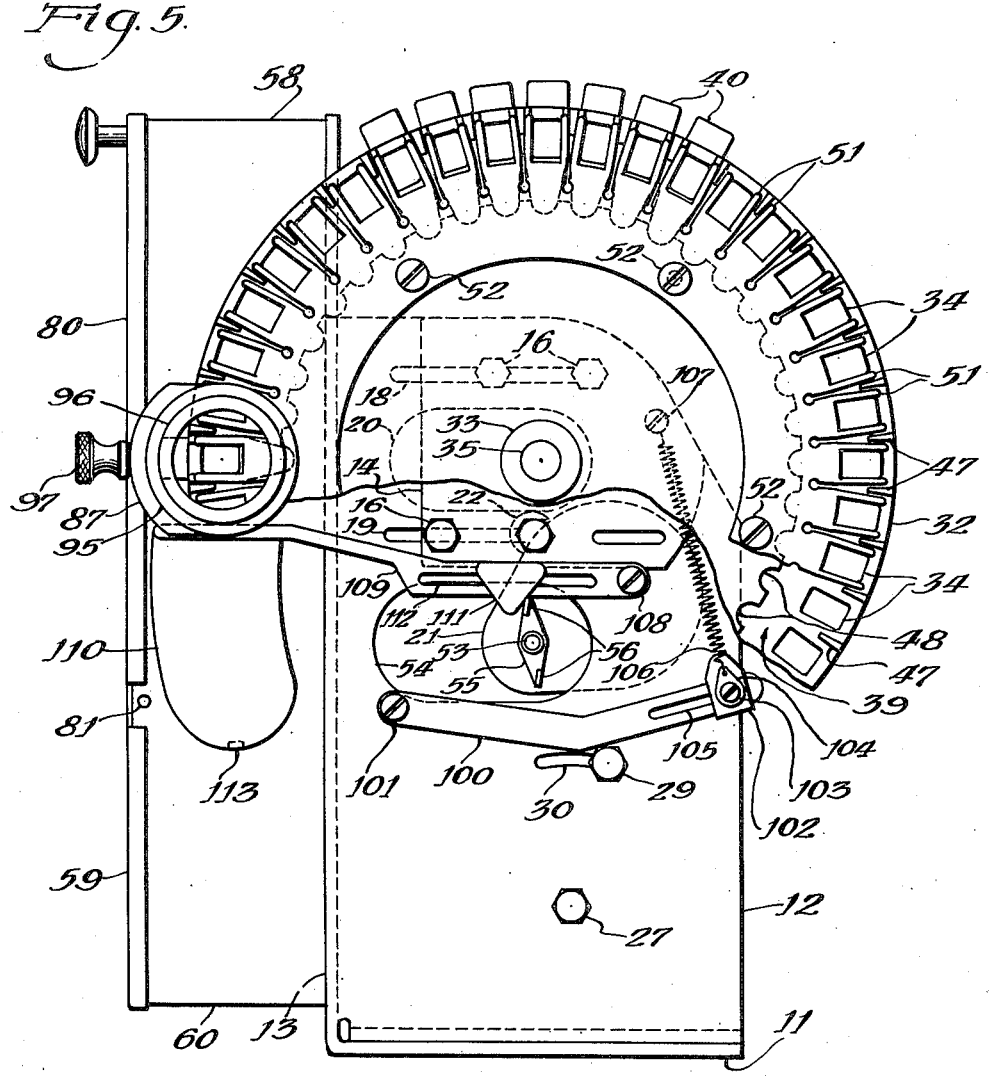
Fig. 5 is a front elevational view of the machine with a part of the wheel cut away for clearness of illustration.

Referring in detail to said drawings, a base plate 11, a front plate 12, and a side plate 13, each attached to the other at right angles, as by welding, form a frame for the projector. A hub plate 14, having a hub 15 formed thereon, is mounted upon the forward side of said front plate by means of three studs 16 secured by nuts 17. Two of said studs project through a horizontal slot 18 in said front plate and a third projects through a similar slot 19. An opening 20 in said front plate provides space for said hub.

A combined electric motor and speed reducing gear unit 21 is mounted upon the rear of said front plate by means of two brackets 22 attached to the casing of said unit, a stud 23 passed through the slot 19 and one of said brackets, and a bolt 24 passed through the other bracket and a slot 25 in an arm 26. Said arm is pivotally mounted upon the rear face of said front plate by the use of a bolt 27 passed through said arm and said plate and secured by a nut 28. Another bolt 29, passed through an arc-shaped slot 30 in said front plate and through said arm, is secured by a nut 31 to firmly hold said motor and gear unit in any of a variety of selective positions, the purpose of which will be hereinafter explained.

A wheel 32 having a center hub 33 and a plurality of evenly spaced apertures 34 near its periphery is rotatably mounted upon a shaft 35 which is supported by the hub 15 and extends through said hub 33 which, when the wheel is in place, is in alignment with the hub 15. On the back side of said wheel is formed a ring 36 (Figs. 1 and 2) upon the outer radial surface of which are a plurality of cam raisers 37, one thereof being radially opposite each of said apertures. On the inner radial surface of said ring are a similar number of projections 38 positioned opposite said raisers.

Figure 6:
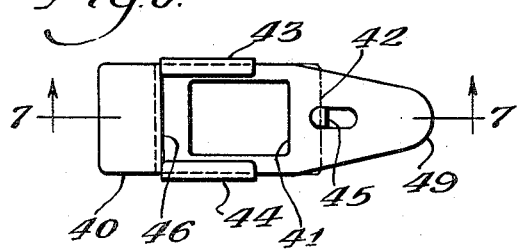
Fig. 6 is an enlarged plan view of a negative mounting frame.
Figure 7:
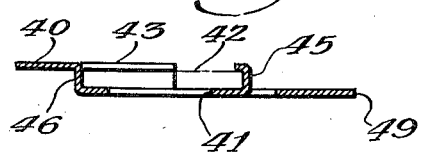
Fig. 7 is a cross-sectional view thereof taken on a line 7—7 in Fig. 6.

On the forward surface of said wheel a circumferential recess, shown generally at 39 (Fig. 5), may be milled out or otherwise formed for receiving interchangeable holding frames 40, each of which are identical and may comprise a single piece of sheet metal having an aperture 41 therein over which a negative 42 of a picture to be projected may be securely held by side clips 43 and 44, an inner clip 45, and a formed outer end 46 (Figs. 6 and 7).

Spacers 47, one between each of the apertures 34, are provided on the wheel 32 to insure proper spacing of the frames 40 when the same are placed in said recess, and to cause each aperture 41 to lie directly over its corresponding aperture 34. To further insure proper and exact placement of said frames, indentations 48 may be formed in said wheel to receive the tapered and rounded ends 49 of the frames.

A spring disk 50, having pairs of parallel fingers 51 thereon—adapted to retain each of said frames in proper position by contact with the side clips 43 and 44 thereof—is attached to the forward face of the wheel 32 by means of screws 52 threaded therein (Figs. 2 and 5). When said screws are placed so as to penetrate the rear side of the wheel at positions occupied by certain of the projections 38, as is illustrated in Fig. 1, said projections may be eliminated and an extension of said screws substituted therefor.

From the motor and gear unit 21 a drive shaft 53 extends through an opening 54 in the front plate 12. Said shaft has mounted on the forward end thereof an impeller 55 having two blades 56 thereon which revolve to successively make intermittent contact with the projections 38 to drive the wheel 32. By selecting a desired gear ratio in the unit 21, said impeller may be caused to turn at any speed desired and the wheel 32 thus intermittently rotated at a rate corresponding to said speed.

On the side plate 13 is mounted, as by screws (not shown), a lamp housing (shown particularly in Fig. 3) comprising a top 57, a front 58, a side 59, a circular bottom portion 60 and a back 61. Within said housing may be mounted a lamp socket of a well known type shown generally at 62 and therein a projector lamp 63. Said socket may be supported by a bracket 64 secured to the plate 13 in any suitable manner and by a clamp 65 attached to said bracket by screws 66. Suitable electric conductors 67 may enter said lamp housing through a hole and grommet 68 in said plate 13 and be connected to said socket in the usual manner.

In the lower portion of the lamp housing is a centrifugal air fan 69, having blades 70, mounted upon a shaft 71 of an electric motor 72, which may be mounted on the plate 13 outside of the lamp housing by means of spacers 73 and bolts 74 threaded into said plate. Said shaft passes through a hole 75 in said plate which serves as an air intake for the fan. Above the fan and around said lamp is an air channel, for directing air from the fan to cool the lamp, comprising sides 76 and 77, a back 78 and a front 79, the latter three of which may be mounted in any suitable manner to a lamp house door 80 attached to the lamp house side 59 by means of a hinge pin 81. The air from said fan, after having cooled the lamp, may emerge from the lamp housing through openings shown generally at 82 and 83, over the latter of which may be placed a light shield (not shown). The bottom portion of the air channel may be flared as best shown in Fig. 3.

A reflector 84 is mounted within an opening in the back 78 of said air channel opposite the filament of the lamp and may be secured therein by means of clips 85. An opening 86 in the front 79 of the air channel is provided opposite said reflector for receiving a lens holder 87 which is stationarily mounted in the front 58 of the lamp housing directly in front of said lamp filament by means of screws 88 passed through the plate 13 and threaded into said holder. The lens holder is of single piece, generally tubular, construction having a rear portion 89 in which condenser lenses 90 and 91 may be secured by a spring 92 and a clip ring 93 adapted to fit into a groove 94 (Fig. 4). In a front portion 95 of said holder a projection lens assembly 96 of well known construction is slidably mounted to provide means for adjusting the focus of the lenses. The assembly may be held securely in a selected position by means of a set screw 97 threaded in said front portion. Between the front and rear portions of said lens holder is an opening 98 through which the periphery of the wheel 32 is rotated to intermittently bring the negatives 42 into the optical axis of the lenses. The rigid single piece construction of the lens holder provides a fixed optical axis which cannot become distorted by vibration or the like. Similarly, the rigidity of the holder prevents any unintended change of focus however slight. Below said opening an air channel 99 is formed in the front 58 of the lamp housing to direct a part of the air from the fan into said opening and upon said negatives to cool the latter while they are in said optical axis (Fig. 3).

On the front of the plate 12 an arm 100 is pivotally mounted at one of its ends upon a stud 101 threaded into said plate and upon its other end is adjustably mounted a fiber cam 102 secured to said arm by means of a bolt 103 passed through said cam, a bracket 104 and a slot 105 in said arm (Fig. 5). Said cam is caused to ride upon the outer radial surface of the ring 36 by the action of a spring 106, one end of which is secured to the plate 12 by a screw 107, and the other end of which is attached to the bracket 104. When the wheel 32 is being revolved by one of the impeller blades 56, the cam rides over one of the cam raisers 37, and when neither of the impeller blades is in contact with a projection 38, the cam rests in a depression between two of the cam raisers and holds the wheel in position to insure that negatives 42 are properly intersecting the axis of the lenses as shown in Fig. 5.

Also pivotally mounted upon the front face of plate 12 by a screw 108 is a shutter arm 109 having a shutter plate 110 fixed thereon (see Fig. 5). A cam 111 is adjustably mounted on said shutter arm and, by virtue of a slot 112 in said arm, may be adjusted to a position to be contacted by the impeller blades 56. One of said blades acts upon said cam to raise the shutter arm, and consequently the shutter plate 110, at the periods during which the other blade is rotating the wheel 32 by contact with one of the projections 38. In this manner said shutter plate is caused to be raised into the opening 98 to cut off the beam of light through the lenses at all times during which the wheel 32 is being moved. If desired, a stop 113 may be provided upon the lowermost edge of the shutter plate to limit its upward travel.

It will readily be understood from the above description that, while Figs. 1 and 3, for convenience in illustration, show only a few of the negative holding frames 40 in place on the wheel 32, in operation a frame and its negative may be inserted over each of the apertures 34. In this condition and with electric power supplied to both of the electric motors and to the lamp 63, the wheel and its frames 40 will be intermittently rotated by the action of the impeller blades 56 on the projections 38 so that the negatives 42 will be successively brought into the beam of light between the lenses and each momentarily allowed to remain in that position before it is replaced by the next negative. In this manner the images represented by said negatives may be projected upon a screen (not shown), one after the other, for so long as electric power is supplied.

The manner in which I mount certain of the above-described parts on the front plate 12 of my machine provides the means by which wheels 32 of different diameters may be employed having different numbers of apertures 34 therein and carrying different numbers of frames 40. Thus, if the wheel illustrated in the drawings, for example, is found to provide for more frames and negatives than the operator cares to display, a smaller wheel may be substituted therefor. To make this change the larger wheel is taken off of the shaft 35 and the smaller one placed thereon. The nuts 17 are loosened and the hub plate 14, with its studs 16 in the slots 18 and 19, is moved to the right (as viewed in Fig. 1) until the apertures 34 of the smaller wheel make proper alignment with the optical axis of the lenses, and in such position the nuts 17 are again tightened. It will be noted that the shape of the opening 20 provides room for the hub 15 regardless of the change in the position of the hub plate. The bolts 23 and 24 and the nut 31, which assist in securing the motor and gear unit 21, are then loosened and the entire unit 21 is moved sideways and pivoted upwardly about the bolt 23 so that the impeller blades 56 will be in proper position to correctly engage the projections 38 of the smaller wheel. During this latter movement the arm 26 will pivot about the bolt 27 and the bolts 29 and 24 will slide in the slots 30 and 25, respectively, as desired. The cams 102 and 111 are likewise readjusted in their respective slots 105 and 112 to properly meet their engaging members and, upon the tightening of all of the loose nuts and bolts above mentioned, the machine is prepared to display the reduced number of images in the smaller wheel in a manner identical to that described above.

Regardless of the size of the wheel employed, if the operator so desires, the position of the motor and gear unit 21, and consequently that of the impeller 55 and its blades 56, may be changed by moving the same sideways to obtain an adjustment whereby said impeller blades will engage every second one of said projections 38 and thus cause the wheel to be rotated intermittently in a manner such that every second one of the apertures 34 will momentarily come to rest in the optical axis of the lenses. In this way one-half of the total number of negatives held by the wheel being employed may be displayed at the will of the operator.

The foregoing detailed description has been given for clearness of understanding only, and no unnecessary limitations should be understood therefrom.

I claim.

1. A light projector for displaying a plurality of images comprising: a supporting frame; an intermittently rotatable wheel having a plurality of peripheral apertures adapted to receive interchangeable images; a source of light; a lens providing an optical axis; a laterally adjustable hub plate adapted to support said wheel whereby said images may be caused to intersect said optical axis irrespective of the diameter of said wheel; securing means for attaching said plate in selected adjusted positions on said frame, the latter being formed to receive said securing means in different adjusted positions; a driving means; a member driven by said means and adapted to momentarily and repeatedly engage said wheel whereby the latter will be intermittently rotated through an angle to move said images into said optical axis; means including a pivoted arm for supporting said driving means and said member and for adjusting the same both laterally and vertically on said frame; and means for securing said driving means to the frame in different positions to accommodate the same to the size and position of the wheel to be rotated thereby.

2. A light projector for displaying a plurality of images comprising: a supporting frame; an intermittently rotatable wheel having a plurality of projections on a face thereof and a plurality of peripheral apertures adapted to receive interchangeable images; a source of light; a lens providing an optical axis; a laterally adjustable hub plate adapted to support said wheel whereby said images may be caused to intersect said optical axis irrespective of the diameter of said wheel; securing means for attaching said plate in selected adjusted positions on said frame, the latter being formed to receive said securing means in different adjusted positions; a driving means; a member driven by said means and adapted to momentarily and successively engage said projections and thereby cause said wheel to be intermittently rotated through an angle to successively move said images into said optical axis within said opening; means including a pivoted arm for supporting said driving means and said member and for adjusting the same both laterally and vertically on said frame; and means for securing said driving means to the frame in different positions to accommodate the same to the size and position of the wheel to be rotated thereby.

3. A light projector for displaying a plurality of images comprising: a supporting frame; an intermittently rotatable wheel having a plurality of projections on a face thereof and a plurality of peripheral apertures adapted to receive interchangeable images; a source of light; a lens providing an optical axis; a driving means; an adjustable member driven by said means and arranged to momentarily engage each of said projections on said wheel successively when in one adjusted position or to similarly engage every second one of said projections when in another selected position whereby said wheel may be selectively caused to intermittently be rotated through an angle to successively move each of said images, or every second one of said images, into said optical axis; and securing means for attaching said driving means to said supporting frame in either of the aforesaid positions.

4. A light projector for displaying a plurality of images comprising: a supporting frame; an intermittently rotatable wheel having a plurality of peripheral apertures adapted to receive interchangeable images; a source of light; a lens providing an optical axis; a laterally adjustable hub plate adapted to support said wheel whereby said images may be caused to intersect said optical axis irrespective of the diameter of said wheel; securing means for attaching asid plate in selected adjusted positions on said frame, the latter being formed to receive said securing means in different adjusted positions; a driving means; a member driven by said means and adapted to momentarily and repeatedly engage said wheel whereby the latter will be intermittently rotated through an angle to move said images into said optical axis; means for securing said driving means to said frame in different positions to accommodate the same to the size and position of the wheel to be rotated; and a shutter assembly comprising an arm, a shutter plate, and a laterally adjustable cam mounted on said arm and engageable with said member whereby said shutter plate will be caused to intersect said optical axis while said wheel is in motion.

5. A light projector for displaying a plurality of images comprising: a supporting frame; an intermittently rotatable wheel having a cam surface on a face thereof and a plurality of peripheral apertures adapted to receive interchangeable images; a source of light; a lens providing an optical axis; a laterally adjustable hub plate adapted to support said wheel whereby said images may be caused to intersect said optical axis irrespective of the diameter of said wheel; securing means for attaching said plate in selected adjusted positions on said frame, the latter being formed to receive said securing means in different adjusted positions; a driving means; a member driven by said means and adapted to momentarily and repeatedly engage said wheel whereby the latter will be intermittently rotated through an angle to move said images into said optical axis; means including a pivoted arm for supporting said driving means and said member and for adjusting the same both laterally and vertically on said frame means for securing said driving means to said frame in different positions to accommodate the same to the size and position of the wheel to be rotated; and a spring loaded stop in engagement with said cam surface whereby said wheel may be maintained in a fixed position when said member is not engaged with said wheel.

6. A light projector for displaying a plurality of images comprising: a supporting frame; an intermittently rotatable wheel having a plurality of projections and a cam surface on a face thereof, and a plurality of peripheral apertures adapted to receive interchangeable images; a source of light; a lens providing an optical axis; a laterally adjustable hub plate adapted to support said wheel whereby said images may be caused to intersect said optical axis irrespective of the diameter of said wheel; securing means for attaching said plate in selected adjusted positions on said frame, the latter being formed to receive said securing means in different adjusted positions; a driving means; a laterally adjustable member driven by said means and adapted to momentarily and successively engage said projections whereby said wheel may be intermittently rotated through an angle to successively move said images into said optical axis; means for securing said driving means to the frame in different positions to accommodate the same to the size and position of the wheel to be rotated thereby; a spring loaded stop in engagement with said cam surface whereby said wheel may be maintained in a fixed position when said member is not engaged with said wheel; and, a shutter assembly comprising an arm, a shutter plate, and a laterally adjustable cam mounted on said arm and engageable with said member whereby said shutter plate may be caused to intersect said optical axis while said wheel is in motion.

7. A light projector for displaying a plurality of images comprising: a supporting frame; an intermittently rotatable wheel having a plurality of peripheral apertures adapted to receive interchangeable images; a source of light, a lens providing an optical axis; a laterally adjustable hub plate adapted to support said wheel whereby said images may be caused to intersect said optical axis irrespective of the diameter of said wheel; securing means, including a pin and slot connection, for attaching said plate in selected adjusted positions on said frame; a driving means; a member driven by said means and adapted to momentarily and repeatedly engage said wheel whereby the latter will be intermittently rotated through an angle to move one of said images into said optical axis; means including a pivoted arm for supporting said driving means and said member and for adjusting the same both laterally and vertically on said frame and means for securing said driving means to the frame in different positions to accommodate the same to the size and position of the wheel to be rotated thereby.

8. A light projector for displaying a plurality of images comprising: a supporting frame; an intermittently rotatable wheel having a plurality of peripheral apertures adapted to receive interchangeable images; a source of light; a lens providing an optical axis; a laterally adjustable hub plate adapted to support said wheel whereby said images may be caused to intersect said optical axis irrespective of the diameter of said wheel; securing means for attaching said plate in selected adjusted positions on said frame; a pivotally-mounted driving means; a member driven by said means and adapted to momentarily and repeatedly engage said wheel whereby the latter will be intermittently rotated through an angle to move one of said images into said optical axis; and means, including a pivotal supporting member and a pin and slot connection between said member and said frame, for supporting said driving means and said member and for moving the same laterally and moving said driving means pivotally to adjust the position thereof both horizontally and vertically; and means securing said driving means to the frame in different positions to accommodate the same to the size and position of the wheel to be rotated thereby.

ALFRED GRUENHUT.

REFERENCES CITED

The following references are of record in the file of this patent:

UNITED STATES PATENTS

| Number | Name | Date |
|---|---|---|
| 737,940 | Leatherbarrow | Sept. 1, 1903 |
| 893,714 | Finch | July 21, 1908 |
| 1,096,873 | Victor | May 19, 1914 |
| 1,292,196 | Mullens | Jan. 21, 1919 |
| 1,313,241 | Ashley | Aug. 19, 1919 |
| 1,446,999 | Whitehead | Feb. 27, 1923 |
| 1,449,663 | Frederick | Mar. 27, 1923 |
| 1,453,893 | Smith | May 1, 1923 |
| 1,457,012 | Whitehead | May 29, 1923 |
| 1,567,471 | Skeen | Dec. 29, 1925 |
| 1,921,214 | Carpenter | Aug. 8, 1933 |
| 1,966,531 | Tint | July 17, 1934 |
| 2,008,020 | Jackman | July 16, 1935 |
| 2,041,412 | Homrighous | May 19, 1936 |
| 2,116,704 | Laube et al. | May 10, 1938 |
| 2,250,298 | Ditty et al. | July 22, 1941 |
| 2,373,392 | Griswold | Apr. 10, 1945 |

FOREIGN PATENTS

| Number | Country | Date |
|---|---|---|
| 121,695 | Germany | July 6, 1901 |
| 670,314 | France | Aug. 17, 1929 |
| 423,802 | Great Britain | Feb. 8, 1935 |